United States Patent
Radoslaw et al.

(10) Patent No.: US 11,658,561 B2
(45) Date of Patent: May 23, 2023

(54) LCL FILTER

(71) Applicant: ABB Schweiz AG, Baden (CH)

(72) Inventors: Jez Radoslaw, Zory (PL); Miskiewicz Milosz, Cracow (PL)

(73) Assignee: ABB Schweiz AG, Baden (CH)

( * ) Notice: Subject to any disclaimer, the term of this patent is extended or adjusted under 35 U.S.C. 154(b) by 181 days.

(21) Appl. No.: 17/091,358

(22) Filed: Nov. 6, 2020

(65) Prior Publication Data
US 2021/0143726 A1 May 13, 2021

(30) Foreign Application Priority Data
Nov. 7, 2019 (EP) .................................... 19207847

(51) Int. Cl.
*H02M 1/12* (2006.01)
*H01F 27/24* (2006.01)
*H01F 27/30* (2006.01)

(52) U.S. Cl.
CPC ............ *H02M 1/126* (2013.01); *H01F 27/24* (2013.01); *H01F 27/306* (2013.01)

(58) Field of Classification Search
CPC .............................. H02M 1/126; H02M 1/14
See application file for complete search history.

(56) References Cited

U.S. PATENT DOCUMENTS

| 4,422,056 | A | | 12/1983 | Roberts | |
|---|---|---|---|---|---|
| 5,754,034 | A | * | 5/1998 | Ratliff | H01F 38/08 336/160 |
| 7,453,331 | B2 | | 11/2008 | Engelage | |
| 9,595,906 | B2 | | 3/2017 | Yamamoto | |
| 2009/0231885 | A1 | * | 9/2009 | Won | H01F 27/38 336/212 |
| 2016/0172094 | A1 | * | 6/2016 | Yeom | H01F 1/20 336/220 |
| 2019/0312542 | A1 | * | 10/2019 | Tagawa | H02M 5/42 |

FOREIGN PATENT DOCUMENTS

| DE | 102011102134 A1 | | 11/2012 | |
|---|---|---|---|---|
| EP | 1805879 B1 | | 5/2008 | |
| ES | 2334532 A1 | * | 3/2010 | ............ H03H 7/09 |
| ES | 2334532 A1 | | 3/2010 | |
| WO | 0062396 A1 | | 10/2000 | |

OTHER PUBLICATIONS

European Patent Office, Extended Search Report issued in corresponding Application No. 19207847.5, dated Apr. 17, 2020, 8 pp.

* cited by examiner

*Primary Examiner* — Adolf D Berhane
*Assistant Examiner* — Afework S Demisse
(74) *Attorney, Agent, or Firm* — Leydig, Voit & Mayer, Ltd.

(57) ABSTRACT

A LCL filter for a 1 or 3-phase grid including one magnetic core, at least one primary winding, at least one secondary winding, at least one winding for reducing flux ripples in the magnetic core located between the primary winding and the secondary winding, wherein the windings are placed on the magnetic core, the primary winding is connected to the input of the LCL filter for connecting the filter to an inverter, the secondary winding is connected to the output of the LCL filter for connecting the filter to a load or grid and the winding is connected to the filter capacitor wherein the magnetic core is a closed magnetic core and the windings are galvanically insulated.

8 Claims, 2 Drawing Sheets

LCL FILTER

FIELD OF THE INVENTION

The present invention relates to LCL filter for one or 3 phase systems.

BACKGROUND OF THE INVENTION

Filters are widely used in power electronic converters to fulfill the requirements of power supply quality. In medium and high-power solutions, converters are connected to loads via transformers.

The typical filter system is based on LCL topology which includes three components: an inverter side inductor, a grid side inductor and a filter capacitor. The sinusoidal wave is transferred from the inverter side to the grid side of the filter. Current ripples are closed between the inverter side inductor and the filter capacitor.

The implementation of traditional solutions requires several components at the output stage of an converter (an inverter side inductor, a grid side inductor, a filter capacitor, a transformer) requiring space, increasing costs and decreasing of output efficiency of the whole system.

The european patent EP1805879B1 discloses a multi-phase passive filter, in particular the three-phase filter, in which an input and output choke are integrated on a single magnetic core. The winding of the choke is divided into at least two parts and to such a point of division capacity is galvanically connected, so the branch with capacitors is a combination of inductance-capacity.

German patent application DE102011102134A1 discloses a filter for coupling an AC voltage source with a network impulse transducer circuit, where the output choke is divided into two chokes. One choke is located on the common core with the input choke and the other choke is a separate component. The filter can be used in both single-phase and three-phase networks.

The international patent application WO0062396 discloses a LCL filter containing a magnetic core with air gap, in which the filter and capacitor circuit are galvanically connected to the point between the input and output windings. The filter can be used in single-phase and three-phase networks.

The object of the invention is to provide a filter without the above drawbacks.

BRIEF DESCRIPTION OF THE INVENTION

LCL filter for 1 or 3-phase grid comprising one magnetic core, at least one primary winding $L_{INn}$, at least one secondary winding $L_{OUTn}$, at least one winding $Lf_n$ for reducing flux ripples in the magnetic core, located between the primary winding $L_{INn}$ and the secondary winding $L_{OUTn}$, wherein said windings $L_{INn}$, $L_{OUTn}$, $L_{fn}$ are placed on the magnetic core, the primary winding $L_{INn}$ is connected to the input $F_{INn}$ of said LCL filter for connecting the filter to an inverter, the secondary winding $L_{OUTn}$ is connected to the output $F_{OUTn}$ of said LCL filter for connecting the filter to a load or a grid and winding $Lf_n$ is connected to the filter capacitor $Cf_n$ characterized in that the magnetic core is a closed magnetic core and said windings $L_{INn}$, $L_{OUTn}$, $L_{fn}$ are galvanically insulated.

Preferably at least one winding $L_{fn}$ is connected to the at least one filter capacitor $C_{fn}$ by a dumping resistor $R_{fn}$.

In the case of 3-phase LCL filter the magnetic core preferably comprises three columns wherein each column comprises one primary winding $L_{INn}$, one secondary winding $L_{OUTn}$ and one winding $L_{fn}$.

The proposed solution allows on the integration of output filter and transformer functionality within one compact component instead of two separated inductors and capacitor bank known in the state of the art. It reduces the required space and costs of implementation and it increases output efficiency of a system consisting of an inverter and an LCL filter. Additionally, the galvanic insulation between an input and an output allows on coupling of an inverter, filtering capacitors and output at different voltage and current ratings. What is more the LCL filter according the invention provides better attenuation.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Embodiment 1

A one-phase LCL filter 1 comprising one closed magnetic core 2 one primary winding $L_{IN1}$, one secondary winding $L_{OUT1}$, one winding $Lf_1$ for reducing flux ripples in the magnetic core 2 located between the primary winding $L_{IN1}$ and the secondary winding $L_{OUT1}$. Said windings $L_{IN1}$, $L_{OUT1}$, $L_{f1}$ are placed on the magnetic core 2 and are galvanically insulated. The primary winding $L_{IN1}$ is connected to the input $F_{IN1}$ of said LCL filter 1 which is connected to a one-phase inverter. The secondary winding $L_{OUT1}$ is connected to the output $F_{OUT1}$ of said LCL filter 1 which is connected to a one-phase load or grid. The third winding $Lf_1$ is connected to the filter capacitor $Cf_1$.

The operation of a LCL filter 1 is as follow. A primary winding $L_{IN1}$ is connected to the output current of an inverter (sinusoidal current with ripples) by the input $F_{IN1}$ of the LCL filter 1. The output current of the inverter produces a flux in a magnetic core 2 (sinusoidal flux with ripples). This flux induces voltage in the winding $L_f$ connected to a capacitor $Cf_1$ (low impedance for ripples, high impedance for low harmonic). Current ripples in the circuit $C_f$-$L_f$ produces flux ripples with the opposite direction to flux ripples produced by the output current of the inverter. The same, flux ripples in the magnetic core 2 are reduced. The other part of the magnetic flux has the sinusoidal shape and induces the sinusoidal current without ripples in an output winding $L_{OUT1}$.

It is possible to implement a voltage/current ratio between an inverter side, a load side and a capacitor side what means that the inverter can operate with a higher or lower voltage than load (power losses, voltage and current ratings can be reduced). The amplitude of current ripples in the filtering windings can be modified by a turn ratio.

Embodiment 2

Figure 1:
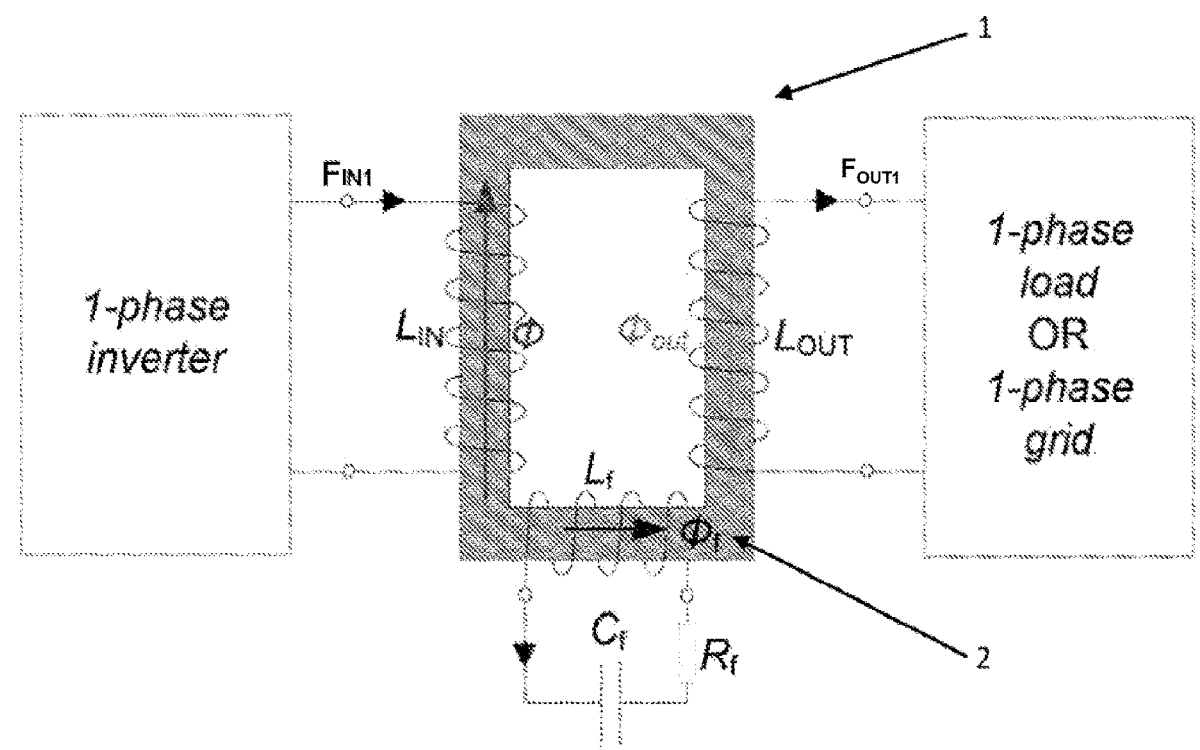
FIG. 1 shows an LCL filter according to the invention connected to one phase system.

FIG. 1 shows a one-phase LCL filter 1 comprising one closed magnetic core 2, one primary winding $L_{IN1}$, one secondary winding $L_{OUT1}$, one winding $Lf_1$ for reducing flux ripples in the magnetic core 2 located between the primary winding $L_{IN1}$ and the secondary winding $L_{OUT1}$. Said windings $L_{IN1}$, $L_{OUT1}$, $L_{f1}$ are placed on the magnetic core 2 and are galvanically insulated. The primary winding $L_{IN1}$ is connected to the input $F_{IN1}$ of said LCL filter 1 which is connected to a one-phase inverter. The secondary winding $L_{OUT1}$ is connected to the output $F_{OUT1}$ of said LCL filter 1 which is connected to a one-phase load or grid. The third winding $Lf_1$ is connected to the filter capacitor $Cf_1$ by a dumping resistor $R_{f1}$.

The operation of the LCL filter according to this embodiment of the invention is the same as in embodiment 1.

Embodiment 3

A three-phase LCL filter 1 comprising three primary windings $L_{IN1}$, $L_{IN2}$, $L_{IN3}$, three secondary winding $L_{OUT1}$, $L_{OUT2}$, $L_{OUT3}$ and three windings $L_{f1}$, $L_{f2}$, $L_{f3}$ for reducing flux ripples. Said windings are placed on a closed magnetic core 2 comprising three columns 3 wherein each column 3 comprises one primary winding $L_{IN1}$, $L_{IN2}$, $L_{IN3}$, one secondary winding $L_{OUT1}$, $L_{OUT2}$, $L_{OUT3}$ and one winding $L_{f1}$, $L_{f2}$, $L_{f3}$ located between the primary windings $L_{IN1}$, $L_{IN2}$, $L_{IN3}$ and the secondary windings $L_{OUT1}$, $L_{OUT2}$, $L_{OUT3}$ The primary windings $L_{IN1}$, $L_{IN2}$, $L_{IN3}$ are connected to the inputs $F_{IN1}$, $F_{IN2}$, $F_{IN3}$, of said LCL filter 1 for connecting the filter to an inverter. The secondary windings $L_{OUT1}$, $L_{OUT2}$, $L_{OUT3}$ are connected to the outputs $F_{OUT1}$, $F_{OUT2}$, $F_{OUT3}$, of said LCL filter 1 for connecting the filter to a grid and the windings $L_{f1}$, $L_{f2}$, $L_{f3}$ are connected to the filter capacitors $Cf_1$, $Cf_2$, $Cf_3$. Said windings $L_{INn}$, $L_{OUTn}$, $L_{fn}$ are galvanically insulated.

The operation of the LCL filter according to this embodiment of the invention is the same as in embodiment 1

Embodiment 4

Figure 2:
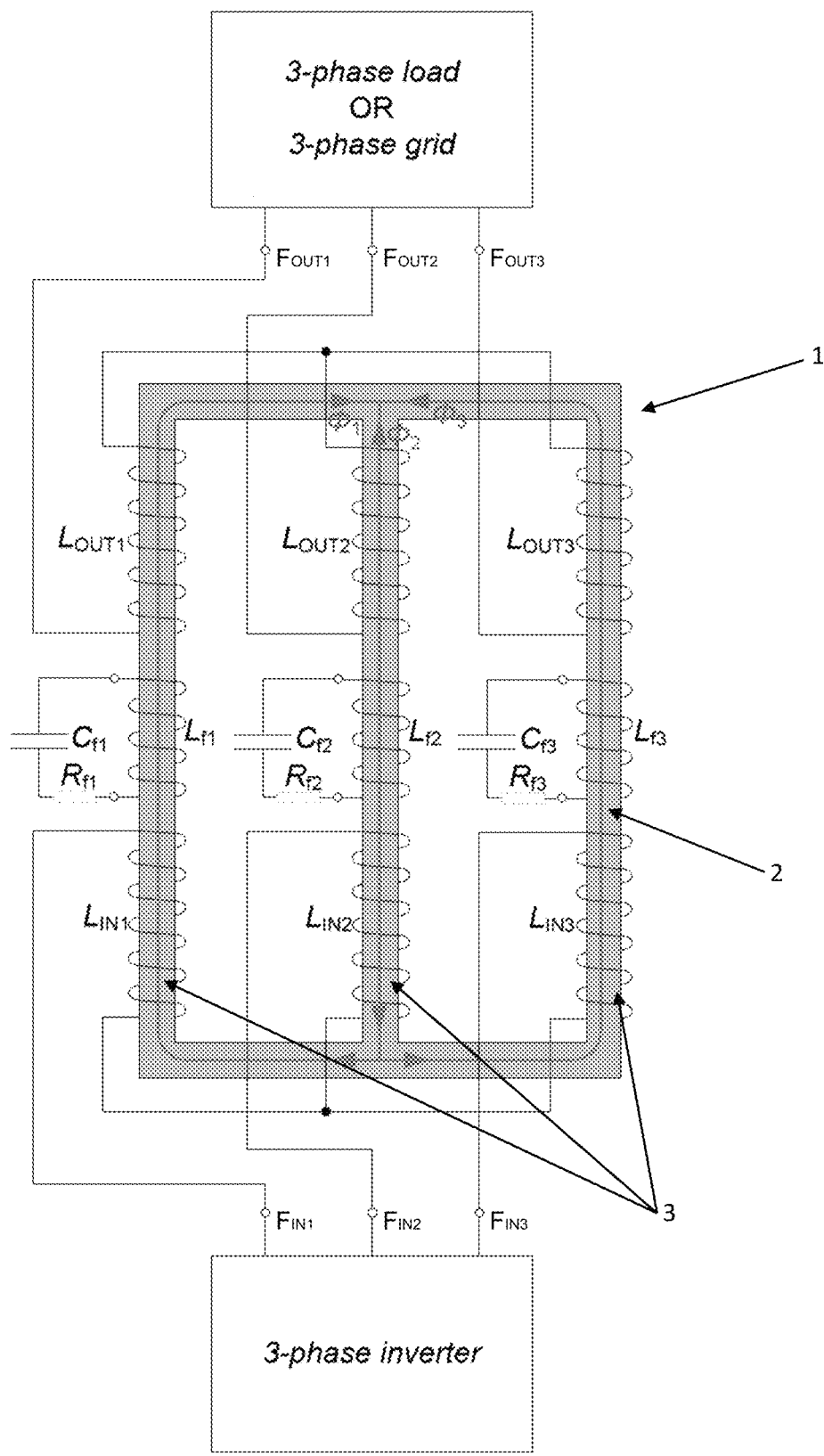
FIG. 2 shows an LCL filter according to the invention connected to three phase system.

FIG. 2 shows a three-phase LCL filter 1 comprising three primary windings $L_{IN1}$, $L_{IN2}$, $L_{IN3}$, three secondary winding $L_{OUT1}$, $L_{OUT2}$, $L_{OUT3}$ and three windings $L_{f1}$, $L_{f2}$, $L_{f3}$ for reducing flux ripples. Said windings are placed on a closed magnetic core 2 comprising three columns 3 wherein each column 3 comprises one primary winding $L_{IN1}$, $L_{IN2}$, $L_{IN3}$, one secondary winding $L_{OUT1}$, $L_{OUT2}$, $L_{OUT3}$ and one winding $L_{f1}$, $L_{f2}$, $L_{f3}$. The primary windings $L_{IN1}$, $L_{IN2}$, $L_{IN3}$ are connected to the inputs $F_{IN1}$, $F_{IN2}$, $F_{IN3}$, of said LCL filter 1 for connecting the filter to an inverter. The secondary windings $L_{OUT1}$, $L_{OUT2}$, $L_{OUT3}$ are connected to the outputs $F_{OUT1}$, $F_{OUT2}$, $F_{OUT3}$, of said LCL filter 1 for connecting the filter to a load or a grid and the windings $L_{f1}$, $L_{f2}$, $L_{f3}$ are connected to the filter capacitors $Cf_1$, $Cf_2$, $Cf_3$ by a dumping resistors $R_{f1}$, $R_{f2}$, $R_{f3}$. Said windings $L_{INn}$, $L_{OUTn}$, $L_{fn}$ are galvanically insulated.

The operation of the LCL filter according to this embodiment of the invention is the same as in embodiment 1

The invention claimed is:

1. An LCL filter for 1 or 3-phase grid comprising:
   one magnetic core;
   at least one primary winding;
   at least one secondary winding; and
   at least one winding for reducing flux ripples in the magnetic core located between the primary winding and the secondary winding,
   wherein:
   said windings are placed on the magnetic core,
   the primary winding is connected to the input of said LCL filter for connecting the filter to an inverter,
   the secondary winding is connected to the output of said LCL filter for connecting the filter to a load or grid,
   the winding is connected to the filter capacitor,
   the magnetic core is a closed magnetic core, and
   said windings are galvanically insulated.

2. The LCL filter according to claim 1 wherein the at least one winding is connected to the at least one filter capacitor by a dumping resistor.

3. The LCL filter according to claim 1 wherein in the case of a 3-phase LCL filter the magnetic core comprises three columns wherein each column comprises one primary winding, one secondary winding and one winding.

4. The LCL filter according to claim 2 wherein in the case of a 3-phase LCL filter the magnetic core comprises three columns wherein each column comprises one primary winding, one secondary winding and one winding.

5. The LCL filter according to claim 1, wherein the magnetic core includes no air gaps.

6. The LCL filter according to claim 1, wherein the magnetic core includes no gaps comprising a lower magnetic permeability than the magnetic permeability of the magnetic core.

7. The LCL filter according to any claim 1, wherein a magnetic permeability of the magnetic core is essentially constant throughout a magnetic circuit formed by the LCL filter.

8. The LCL filter according to claim 1, wherein:
   no magnetic flux passes through a gap in a magnetic circuit formed by the LCL filter, and
   the gap comprises a different magnetic permeability from a remainder of the magnetic core.

* * * * *